US009657764B2

(12) United States Patent
Vargha et al.

(10) Patent No.: US 9,657,764 B2
(45) Date of Patent: May 23, 2017

(54) FASTENING DEVICE AND METHOD FOR FASTENING AN ELEMENT IN A KEYHOLE-SHAPED CUTOUT IN A WALL

(75) Inventors: David Vargha, Budapest (HU); Boris Adam, Gaeufelden (DE); Ulf Behnke, Reutlingen (DE); Jeanine Wegner, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 448 days.

(21) Appl. No.: 12/737,580

(22) PCT Filed: May 28, 2009

(86) PCT No.: PCT/EP2009/056538
§ 371 (c)(1),
(2), (4) Date: Apr. 13, 2011

(87) PCT Pub. No.: WO2010/012523
PCT Pub. Date: Feb. 4, 2010

(65) Prior Publication Data
US 2011/0258835 A1 Oct. 27, 2011

(30) Foreign Application Priority Data

Jul. 28, 2008 (DE) .................. 10 2008 040 792

(51) Int. Cl.
B23P 11/00 (2006.01)
F16B 21/09 (2006.01)
F16B 5/02 (2006.01)
(52) U.S. Cl.
CPC ................ *F16B 21/09* (2013.01); *F16B 5/02* (2013.01); *Y10T 29/49947* (2015.01); *Y10T 403/587* (2015.01)

(58) Field of Classification Search
CPC ........ F16B 21/09; F16B 5/02; Y10T 403/587; Y10T 29/49947; H01R 13/6275
(Continued)

(56) References Cited

U.S. PATENT DOCUMENTS

| 4,266,386 A | 5/1981 | Bains |
| 5,494,457 A * | 2/1996 | Kunz ..................... H01R 13/58 439/344 |

(Continued)

FOREIGN PATENT DOCUMENTS

| CN | 1138762 | 12/1996 |
| CN | 1350112 | 5/2002 |

(Continued)

OTHER PUBLICATIONS

Woernle et al. Machine Translation of DE 102 38 528 A1.*

*Primary Examiner* — Essama Omgba
*Assistant Examiner* — Lee A Holly
(74) *Attorney, Agent, or Firm* — Norton Rose Fulbright US LLP; Gerard A. Messina

(57) ABSTRACT

A fastening device for fastening an element in a keyhole-shaped cutout in a wall includes a retaining element which in the fastened state of the fastening device is configured to rest against a front side of the wall, and to at least partially cover an edge of a narrower opening of the keyhole-shaped cutout. The fastening device also has a locking element which in the fastened state of the fastening device is configured to engage through a wider opening of the keyhole-shaped cutout, and to retain the fastening device from a back side of the wall.

8 Claims, 3 Drawing Sheets

(58) Field of Classification Search
USPC ...... 411/103; 439/135, 278, 577; 29/525.01, 29/525.11
See application file for complete search history.

(56) References Cited

U.S. PATENT DOCUMENTS

| | | | | |
|---|---|---|---|---|
| 5,779,500 | A | * | 7/1998 | Tokuwa et al. ............... 439/557 |
| 6,126,480 | A | * | 10/2000 | Kawase et al. ............... 439/489 |
| 6,222,123 | B1 | * | 4/2001 | Schwarz ......................... 174/60 |
| 6,281,444 | B1 | * | 8/2001 | Yamanashi ............... 174/138 F |
| 6,309,132 | B1 | | 10/2001 | Jakob et al. |
| 6,354,860 | B1 | * | 3/2002 | Miller et al. ................. 439/352 |
| 6,398,576 | B1 | * | 6/2002 | Hwang .............. H01R 13/6275 439/344 |
| 2006/0024146 | A1 | * | 2/2006 | Fink et al. .................... 411/103 |

FOREIGN PATENT DOCUMENTS

| | | |
|---|---|---|
| DE | 297 14 824 | 10/1997 |
| DE | 10238528 A1 * | 3/2004 |
| EP | 0 747 604 | 12/1996 |
| EP | 1 532 372 | 5/2005 |
| GB | 2 302 125 | 1/1997 |
| JP | 53-131175 | 3/1952 |
| JP | 60-34052 | 3/1985 |
| JP | 2005-536698 | 12/2005 |
| WO | WO 2004/020844 | 3/2004 |

* cited by examiner

FASTENING DEVICE AND METHOD FOR FASTENING AN ELEMENT IN A KEYHOLE-SHAPED CUTOUT IN A WALL

BACKGROUND OF THE INVENTION

1. Field of the Invention

The present invention relates to a fastening device and a method for fastening an element in a keyhole-shaped cutout in a wall.

2. Description of the Related Art

Components, in particular sensors (for restraint systems, for example), are fastened to the vehicle in various ways in the automotive industry. In addition to screwing to a nut welded into the body, or screwing with the aid of a screw through a hole in the body and into a threaded bushing of the component, the "keyhole principle" is used for fastening housings. A bolt which is preinstalled'in the housing together with a self-locking nut is inserted into the larger portion of a keyhole-like hole in the body panel of the vehicle, and is then suspended in the lower, narrower portion of the keyhole. The nut is then tightened, thus securely clamping the component.

Compared to the two other methods mentioned above, the keyhole principle has the advantage that a welded-in or preinstalled nut in the vehicle is not required, which represents a significant cost advantage. The keyhole principle also allows so-called "one-hand installation," and its use is therefore very popular in some cases, for example in installation areas which are difficult to access.

However, during installation the component may twist in the keyhole if appropriate anti-twist protection is not provided. The sensor cannot be guaranteed to fulfill its function if it twists during installation.

A component is known from published European patent document EP 1 532 372 which has anti-twist protection for installation in a keyhole-shaped cutout. However, the component must first be inserted into the keyhole and secured therein in order for the anti-twist protection to become effective.

BRIEF SUMMARY OF THE INVENTION

The present invention provides a fastening device for fastening in a keyhole-shaped cutout in a support or a wall, the keyhole-shaped cutout being formed by a wider opening in the wall and a narrower opening in the wall which is connected to the wider opening, and the fastening device having the following features:
 a retaining element which in the fastened state of the fastening device is designed to rest against a front side of the wall and to at least partially cover an edge of a narrower opening of the keyhole-shaped cutout; and
 a locking or clamping element which in the fastened state of the fastening device is designed to engage through the wider opening of the keyhole-shaped cutout, and to retain the fastening device from a back side of the wall or the support.

Moreover, the present invention provides a method for fastening a fastening device to a wall which includes a keyhole-shaped cutout, the fastening device including a retaining element and a locking element, the keyhole-shaped cutout being formed by a wider opening in the wall and a narrower opening in the wall which is connected to the wider opening, and the method including the following steps:
 inserting the locking element of the fastening device through the wider opening of the keyhole-shaped cutout in the wall, the retaining element at least partially covering an edge of the narrower opening of the keyhole-shaped cutout;
 locking the locking element on the back side of the wall in the region of the wider opening of the keyhole-shaped cutout; and
 pressing the retaining element against the wall.

The present invention is based on the knowledge that an option, which is simple and cost-effective to manufacture, for securing the fastening device against twisting (for example; while screwing down the fastening device) in a keyhole-shaped cutout in a wall is possible by providing a locking element. When inserted into the keyhole-shaped cutout, the locking element is locked behind the wall in the region of the wider opening in such a way that the fastening device is prevented from falling out of the keyhole-shaped cutout before being "clamped." The fastening device may then be fastened to the wall via the retaining element, the retaining element at least partially covering an edge of the narrower opening of the keyhole-shaped cutout. Covering this edge thus ensures that the fastening device is supported on the wall with sufficient stability and may therefore be fastened. At the same time, by locking the locking element to the (back side of the) wall in the region of the wider opening it may be ensured that the fastening device is not able to twist when fastened to the wall.

The present invention offers the advantage that the protection against twisting of the fastening device when it is fastened to the wall may be significantly improved by simple manufacturing changes. For example, the fastening device may be manufactured as an injection-molded element, so that providing the locking element requires only a slight modification to the appropriate casting mold. In this manner, by using the fastening device according to the present invention it is also possible via simple installation to fasten elements (such as sensors, for example) which require a high-precision alignment to the wall.

In one particular example embodiment of the present invention, the locking element may include a hook which is formed from a flexible material. This offers the option of providing an easily manufactured snap-on device for locking the hook at the back side of the wall, so that fastening only requires brief exertion of pressure on the fastening device in order to lock the locking element into the keyhole-shaped cutout, i.e., the wider opening. In addition, such a locking element may be provided very easily via an appropriate modification of an injection mold, which is filled with a plastic which is flexible in the cured state.

The locking element may also be optimized for installation which may be carried out multiple times (using a beveled flank, for example), and may be detached, without auxiliary means, simply by pulling it out. This offers the advantage that the component may be easily removed if it is incorrectly installed; the present invention is therefore also error-tolerant. The fastening device may also be used multiple times if necessary.

Furthermore, in another example embodiment of the present invention the locking element is designed as a one-way snap-in hook. Since the fastening device is usually needed only once for fastening to the wall, this specific embodiment of the present invention provides the option of tailoring to an optimum retaining characteristic, after the locking, in the design of the hook. A compromise between good retainability and reversibility of the locking may be ensured, depending on the design of the hook.

In addition, the locking element may also include a hook having a connecting web and a hook head, the hook forming an essentially right angle at the transition between the connecting web and the hook head. Such a specific embodiment of the present invention provides particularly good retainability, since a maximum support surface is thus provided between the back side of the wall and the locking element. Thus, in such a design of the locking element it is possible not only to ensure, by using the hook, that the fastening device does not fall out of the keyhole-shaped cutout but also to protect against twisting when the fastening device is tightened against the wall, by using only the locking element.

In another example embodiment of the present invention, the locking element may be at least partially enclosed by a protective element. For example, the protective element may enclose the locking element in a U shape, so that the locking element projects from the protective element only at the open side, and engages with the wall at this side. This protects the locking element from damage, and is advantageous since the locking element, as an element having elastic components, is a sensitive element which may possibly be broken or otherwise damaged during careless installation. However, if the locking element is at least partially enclosed by a protective element (in particular via protection around the bend-back path of the locking element when locking), a substantial increase in the protection of the locking element from damage may be ensured, the provision of this protective element being possible via simple and inexpensive measures (for example, likewise by a simple modification of an appropriate injection mold).

It is also advantageous for the protective element to have a width which essentially corresponds to the width of the wider opening of the keyhole-shaped cutout. Simple protection against twisting may thus be achieved, since the protective element may be supported on the two lateral edges of the wider opening. In this case the locking element only needs to protect the fastening device from falling out, so that it may also be manufactured more easily and therefore more cost-effectively.

The fastening device may also be formed in one piece from plastic. Such a fastening device offers significant advantages in manufacturing compared to a fastening device which must be assembled from multiple elements.

In another example embodiment of the present invention, the fastening device includes at least one screw connection element which in the fastened state of the fastening device is designed to press the retaining element against the wall in the region of the narrower opening. Such a specific embodiment of the present invention provides a quickly and easily fastenable fastening device which may be fastened in the keyhole-shaped cutout.

In addition, according to another example embodiment of the present invention a sensor element having a fastening device may be provided as described above. Such a sensor element offers the advantage that in particular very reliable anti-twist protection may be implemented, so that the sensor element remains aligned with high precision during the fastening.

DETAILED DESCRIPTION OF THE INVENTION

Figure 1:
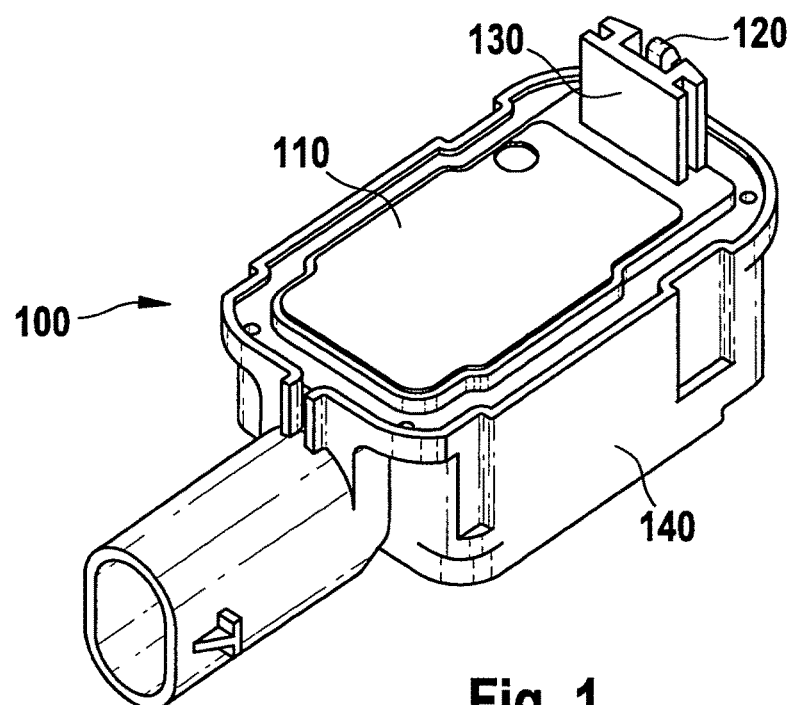
FIG. 1 shows a perspective illustration of one exemplary embodiment of the present invention.

Any indicated dimensions and measurements are for example only, so that the present invention is not limited to these dimensions and measurements. Identical elements are provided with identical reference numerals.

The purpose of the present invention, among other things, is to ensure increased anti-twist protection in the installation of a component, using a keyhole-screw design. The aim is to prevent the component from partially tilting outward after a screw-in bolt is inserted into the keyhole. When this tilting outward occurs, the component may twist about the axis of a fastening bolt so that it may then no longer be correctly screwed on. This risk is eliminated with the aid of the present invention.

FIG. 1 illustrates a perspective view of one exemplary embodiment of the present invention. A fastening element 100 includes a retaining element 110 which is formed by a retaining plate, for example, and which lies against a wall when fastening device 100 is fastened in the keyhole-shaped cutout in the wall or a support. In this case, retaining element 110 should cover an edge of the narrower section (opening) of the keyhole-shaped cutout, so that support of retaining element 110 on the wall as well as contacting (a bolt, for example) through retaining element 110 and into the narrower section of the keyhole-shaped cutout in the wall is possible. The fastening device also includes a locking element 120 which, for example, is a clip-in pin having a locking tab made of a flexible material. The present invention is essentially based on locking of fastening device 100 in the "keyhole" during preinstallation (i.e., insertion of the fastening device into the keyhole). The advantage of the present invention lies in the fact that the fastening device is prevented from partially tilting outward after it has been inserted into the keyhole. Thus, incorrect installation due to twisting of the component after the preinstallation and before the final screwing is effectively prevented.

A protective element 130 which encloses locking element 120 in a U shape is also provided in the exemplary embodiment of the present invention illustrated in FIG. 1. Protective element 130 may have a width which corresponds to the width of the wider opening of the keyhole. It may thus be ensured that, on the one hand, protective element 130 prevents damage or breakage of locking element 120 before fastening device 100 is installed, and, on the other hand, lateral twisting of fastening device 100 during fastening is prevented at the same time. A sensor 140 for measuring an acceleration, for example, may be mounted on fastening device 100, so that high-precision alignment of the sensor before fastening to a body wall of a vehicle, for example, is possible as the result of the protection against twisting which is provided by the present invention. In this manner the alignment is not able to shift, even during mounting of the sensor (using a screwing device, for example).

To provide manufacturing of fastening device 100 in the most simple and cost-effective manner possible, retaining element 110, locking element 120, and protective element 130 may be manufactured in one piece from a flexible plastic material. This merely requires a simple and inexpensive adaptation of an injection mold in order to make use of the advantages of the present invention. The additional consumption of plastic material which is required is negligible.

Figure 2:
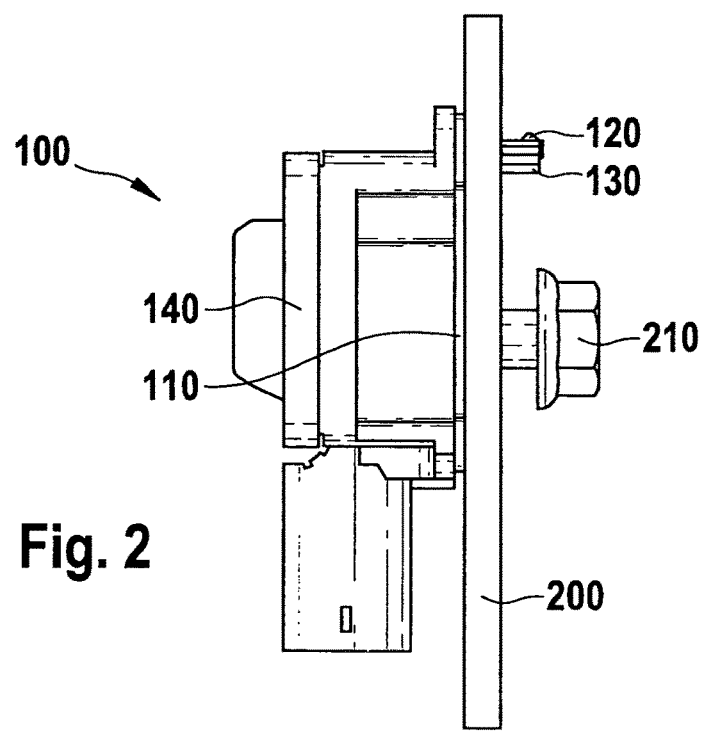
FIG. 2 shows a sectional illustration of one exemplary embodiment of the present invention, in the fastened state.

FIG. 2 shows the exemplary embodiment of the present invention illustrated in FIG. 1 in the installed state on a wall 200, in a sectional illustration. A screw connection 210 is also illustrated, which cooperates with retaining element 110 and fastens fastening device 100 to the wall in the region of the narrower section of the keyhole.

Figure 3:
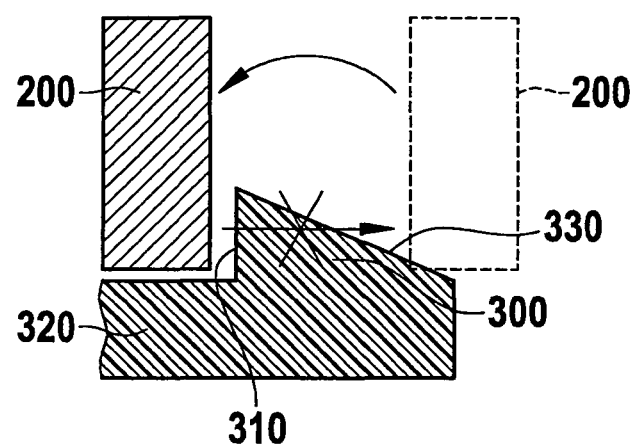
FIG. 3 shows an illustration of a detail of the sectional illustration from FIG. 2, in which the locking characteristics of the locking element before and after locking are illustrated.

The functional principle of the present invention according to the exemplary embodiment illustrated in FIGS. 1 and 2 is shown in greater detail in FIG. 3, which illustrates a detail of the sectional illustration from FIG. 2 (wall 200 being illustrated in dashed lines) and after locking element 120 locks in wall 200. The flexible clip-in pin (i.e., locking element 120) may be deflected in the direction of the screw-in bolt of screw connection 210 as the result of contact with wall 200 when fastening device 100 is pressed in, so that locking tab 300, which rises flatly in the direction of the "housing," may be pressed at the end of the pin through screw-on plate 200. The angle between side 310 of locking tab 300 facing the sensor and a connecting web 320 is much steeper (ideally, 90°) than the angle defined by side 330 of locking tab 300 facing away from the sensor and connecting web 320, so that locking occurs as soon as the highest point of locking tab 300 passes through screw-on plate 200 (i.e., the pin, i.e., the locking element springs back). As a result, the reverse path of locking element 120 out of the keyhole is no longer possible in the ideal case. A plastic anchor 130 is formed around the pin as (further) anti-twist protection, and also for protection of pin 120.

The present invention is embodied, using the example of FIGS. 1 through 3, in such a way that catch hook 120 ideally prevents the anchor from falling out of the keyhole. Anchor 130 also prevents sensor 140 (or a fastening device 100 mounted on sensor 140) from twisting, for example with respect to a door beam of a vehicle body. However, if the retaining connection between locking element 120 and wall 200 is sufficiently strong, it is also possible to prevent twisting of fastening device 100 with respect to the wall about an axis of screw connection 210.

In principle, the present invention may be used for all components which utilize the keyhole-screw concept.

Use of the described approach is currently the only known option for ensuring anti-twist protection when using the hole pattern established by AK-LV29 (standard specification).

Figure 4:
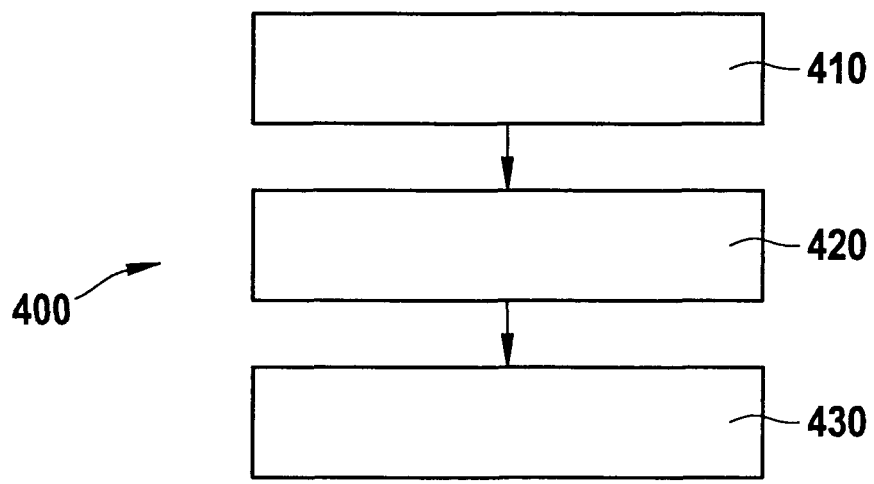
FIG. 4 shows a flow chart of one exemplary embodiment of the present invention as a method.

FIG. 4 illustrates one exemplary embodiment of the present invention as a method 400 for fastening a fastening device to a wall which includes a keyhole-shaped cutout. The fastening device has a retaining element and a locking element, the keyhole-shaped cutout being formed by a wider opening in the wall and a narrower opening in the wall which is connected to the wider opening. The method includes a first step of inserting 410 the locking element of the fastening device through the wider opening of the keyhole-shaped cutout in the wall, the retaining element at least partially covering an edge of the narrower opening of the keyhole-shaped cutout. Method 400 also includes a second step of locking 420 the locking element on the back side of the wall in the region of the wider opening of the keyhole-shaped cutout, and a third step of pressing 430 the retaining element against the wall.

Figure 5:
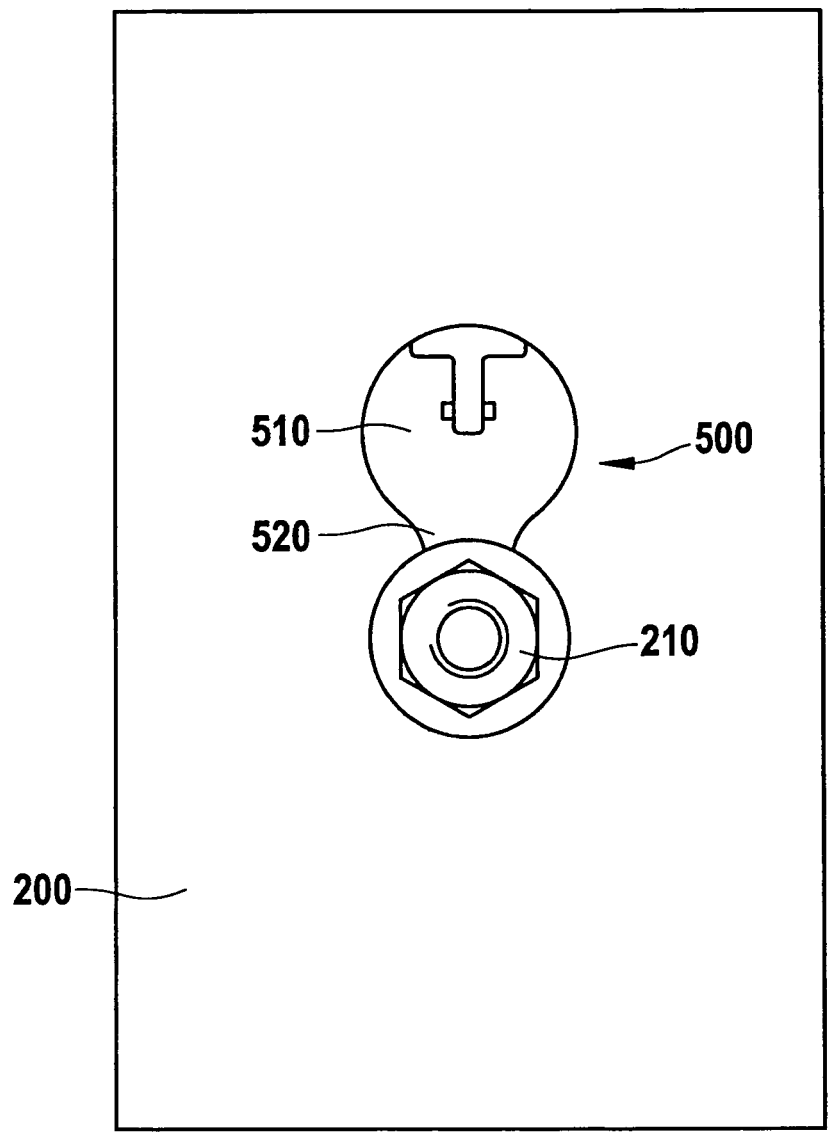
FIG. 5 shows an illustration of one possible shape of the keyhole-shaped cutout in the wall, i.e., the support.

FIG. 5 shows an illustration of one shape of a keyhole-shaped cutout 500 in wall 200 or a support (in front of a back side during the fastening of a fastening device). Wider opening 510 and narrower opening 520 of keyhole-shaped cutout 500 are apparent, narrower opening 520 being essentially covered by screw device 210. An element for retaining fastening device 100 is introduced into wider opening 510.

What is claimed is:

1. A fastening device for fastening an element in a keyhole-shaped cutout in a wall, the keyhole-shaped cutout having a narrower opening and a wider opening, the fastening device comprising:
   a retaining element having a first planar surface forming a first exterior planar surface of the fastening device, wherein in the fastened state of the fastening device, the first planar surface of the retaining element forming the first exterior planar surface of the fastening device is configured to directly contact and rest against a front side of the wall and at least partially cover an edge of the narrower opening of the keyhole-shaped cutout in the wall; and
   a locking element integrally formed with the first planar surface of the retaining element, the locking element extending perpendicularly from the first exterior planar surface of the fastening device and having a catch hook at an end located away from the first exterior planar surface, wherein in the fastened state of the fastening device, the locking element is configured to extend from the front side of the wall to the back side of the wall, across the wider opening of the keyhole-shaped cutout in the wall, such that the catch hook locks against a back side of the wall to secure the first planar surface of the retaining element against the front side of the wall and prevent relative movement between the first planar surface of the retaining element and the front side of the wall;
   wherein the locking element is at least partially enclosed by a protective element, and wherein the protective element is U-shaped around the locking element to cover at least the bottom surface of the locking element.

2. The fastening device as recited in claim 1, wherein the catch hook is formed from a flexible material.

3. The fastening device as recited in claim 1, wherein the protective element is U-shaped around the locking element to cover at least the bottom surface and the two lateral surfaces of the locking element.

4. The fastening device as recited in claim 3, wherein catch hook is a one-way snap-in hook.

5. The fastening device as recited in claim 1, wherein the fastening device is formed in one piece from a plastic material.

6. The fastening device as recited in claim 1, further comprising:
   at least one screw connection element separate from the retaining element, wherein in the fastened state of the fastening device, the at least one screw connection element is configured to press the retaining element against the wall in the region of the narrower opening.

7. A method for fastening a fastening device to a wall having a keyhole-shaped cutout, wherein the fastening device includes (i) a retaining element having a first planar surface forming a first exterior planar surface of the fastening device and (ii) a locking element integrally formed with the first planar surface of the retaining element, the locking element extending perpendicularly from the first exterior planar surface of the fastening device and having a catch hook at an end located away from the first exterior planar surface, and wherein the keyhole-shaped cutout in the wall includes a wider opening and a narrower opening connected to the wider opening, wherein the locking element is at least partially enclosed by a protective element, and wherein the protective element is U-shaped round the locking element to cover at least the bottom surface of the locking element, the method comprising:

inserting the locking element at least partially enclosed by the protective element through the wider opening of the keyhole-shaped cutout in the wall, from a front side of the wall to a back side of the wall, the retaining element at least partially covering an edge of the narrower opening of the keyhole-shaped cutout, and the first planar surface of the retaining element forming the first exterior planar surface of the fastening device directly contacting and resting against the front side of the wall;

locking the catch hook of the locking element against the back side of the wall in the region of the wider opening of the keyhole-shaped cutout to secure the first planar surface of the retaining element against the front side of the wall and prevent relative movement between the first planar surface of the retaining element and the front side of the wall; and pressing the retaining element against the wall.

8. The method according to claim 7, wherein the protective element is U-shaped around the locking element to cover at least the bottom surface and the two lateral surfaces of the locking element.

\* \* \* \* \*